US011465772B2

(12) United States Patent
Schallenberg et al.

(10) Patent No.: US 11,465,772 B2
(45) Date of Patent: Oct. 11, 2022

(54) EXTERIOR AIRCRAFT IMAGE PROJECTOR

(71) Applicant: Goodrich Lighting Systems GmbH, Lippstadt (DE)

(72) Inventors: Bjoern Schallenberg, Geseke (DE); Carsten Pawliczek, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 17/075,921

(22) Filed: Oct. 21, 2020

(65) Prior Publication Data
US 2021/0114746 A1 Apr. 22, 2021

(30) Foreign Application Priority Data

Oct. 22, 2019 (EP) ..................................... 19204623

(51) Int. Cl.
*B64D 47/00* (2006.01)
*B64D 47/02* (2006.01)
*G03B 21/14* (2006.01)
*H04N 9/31* (2006.01)

(52) U.S. Cl.
CPC ........... *B64D 47/02* (2013.01); *G03B 21/145* (2013.01); *H04N 9/3155* (2013.01); *B64D 2203/00* (2013.01)

(58) Field of Classification Search
CPC ..... G03B 21/145; H04N 9/3155; B64D 47/02
See application file for complete search history.

(56) References Cited

U.S. PATENT DOCUMENTS

| 8,152,311 | B2 | 4/2012 | Cho |
| 8,531,130 | B2 | 9/2013 | Schindler |
| 9,567,102 | B1* | 2/2017 | Ross ................... G01C 21/365 |
| 10,397,535 | B2 | 8/2019 | Kilcher et al. |
| 2006/0146896 | A1 | 7/2006 | Park |
| 2007/0104391 | A1* | 5/2007 | Slaughter ................ G06T 15/04 |
| | | | 382/285 |
| 2008/0225241 | A1 | 9/2008 | Chen et al. |

(Continued)

FOREIGN PATENT DOCUMENTS

| EP | 2719625 A1 | 4/2014 |
| EP | 3095710 B1 | 1/2018 |

(Continued)

OTHER PUBLICATIONS

European Search Report for Application No. 19204623.3-1010, dated Apr. 29, 2020, 14 pages.

*Primary Examiner* — Gerald J Sufleta, II
(74) *Attorney, Agent, or Firm* — Cantor Colburn LLP

(57) ABSTRACT

An exterior aircraft image projector includes at least one light source, providing a light output in operation; an optical system configured for transforming the light output of the at least one light source into a light beam and projecting said light beam onto the ground below the aircraft and the of the aircraft; a photo detector arranged to detect a brightness level (Iambient) of the ground or the exterior and configured to provide a corresponding brightness signal; and a controller, coupled to the photo detector and the at least one light source configured to control an intensity of the light output of the at least one light source as a function of the brightness level (Iambient), as provided by the photo detector via the brightness signal.

16 Claims, 4 Drawing Sheets

(56) References Cited

U.S. PATENT DOCUMENTS

| | | | |
|---|---|---|---|
| 2010/0302072 A1* | 12/2010 | Larcher | B64D 47/02 340/945 |
| 2014/0022281 A1* | 1/2014 | Georgeson | G06F 3/1454 345/633 |
| 2014/0253539 A1 | 9/2014 | Kline et al. | |
| 2015/0232198 A1* | 8/2015 | Seibt | B64D 47/06 362/470 |
| 2016/0076722 A1* | 3/2016 | Hessling von Heimendahl | B64D 47/04 362/470 |
| 2017/0257606 A1* | 9/2017 | Walke | G03B 29/00 |
| 2017/0363387 A1 | 12/2017 | Sun et al. | |
| 2018/0054875 A1* | 2/2018 | Schoen | B60Q 1/1423 |
| 2018/0332262 A1 | 11/2018 | Kilcher et al. | |
| 2020/0017236 A1* | 1/2020 | Scheidler | G09F 21/10 |
| 2020/0027361 A1* | 1/2020 | Rutkiewicz | G08G 5/045 |
| 2020/0056885 A1* | 2/2020 | Rutkiewicz | B64D 47/04 |
| 2020/0094987 A1* | 3/2020 | Hessling-Von Heimendahl | B64D 45/0005 |

FOREIGN PATENT DOCUMENTS

| | | |
|---|---|---|
| EP | 2995501 B1 | 12/2018 |
| EP | 3284682 B1 | 4/2019 |
| FR | 3020041 A1 | 10/2015 |

\* cited by examiner

EXTERIOR AIRCRAFT IMAGE PROJECTOR

FOREIGN PRIORITY

This application claims priority to European Patent Application No. 19204623.3 filed Oct. 22, 2019, the entire contents of which is incorporated herein by reference.

FIELD

The present invention is in the field of exterior aircraft lights. The present invention is in particular related to exterior aircraft lights configured for illuminating portions of the ground below the aircraft and/or an exterior surface portion of the aircraft.

BACKGROUND

Almost all aircraft are equipped with exterior lighting systems. For example, large commercial aircraft have many different exterior lights. An exemplary group of exterior aircraft lights are lights for passive visibility and signalling, such as navigation lights and anti-collision lights. Another exemplary group of exterior aircraft lights are headlights that allow the pilots to view the area in front of them, when they are seated in the cockpit, such as taxi lights, take-off lights, landing lights, and runway turn-off lights. Yet another example of exterior aircraft lights are lights configured for illuminating portions of the ground below the aircraft and/or an exterior surface portion of the aircraft. While a large variety of exterior aircraft lighting devices has been developed and is in use, not all of those devices are considered satisfactory in terms of their functionality and/or efficiency.

Accordingly, it would be beneficial to provide an improved lighting device configured for illuminating at least one of portions of the ground below the aircraft and an exterior surface portion of the aircraft.

SUMMARY

Exemplary embodiments of the invention include an exterior aircraft image projector, configured to be installed on an aircraft for projecting an image onto at least one of a ground portion below the aircraft and an exterior surface portion of the aircraft, wherein the exterior aircraft image projector comprises: at least one light source, providing a light output in operation; an optical system configured for transforming the light output of the at least one light source into a light beam and projecting said light beam onto said at least one of the ground portion below the aircraft and the exterior surface portion of the aircraft; a photo detector arranged to detect a brightness level of said at least one of the ground portion below the aircraft and the exterior surface portion of the aircraft and configured to provide a corresponding brightness signal; and a controller coupled to the photo detector and the at least one light source. The controller is configured to control an intensity of the light output of the at least one light source as a function of the brightness level, as it is provided by the photo detector via the brightness signal.

Exemplary embodiments of the invention further include a method of controlling an exterior aircraft image projector, which is configured to be installed on an aircraft for projecting an image onto at least one of a ground portion below the aircraft and an exterior surface portion of the aircraft, and which comprises: at least one light source, providing a light output in operation; and an optical system configured for transforming the light output of the at least one light source into a light beam and projecting said light beam onto said at least one of the ground portion below the aircraft and the exterior surface portion of the aircraft. The method comprises detecting a brightness level of said at least one of the ground portion below the aircraft and the exterior surface portion of the aircraft with a photo detector of the exterior aircraft image projector and controlling an intensity of the light output of the at least one light source as a function of said brightness level. The exterior aircraft image projector, controlled by the method for controlling an exterior aircraft image projector, may be any exterior aircraft image projector, as described herein.

Exemplary embodiments of the invention also include an aircraft, in particular an airplane, comprising at least one exterior aircraft image projector according to an exemplary embodiment of the invention. The at least one exterior aircraft image projector may be any exterior aircraft image projector, as described herein.

An exterior aircraft image projector and a method of controlling an exterior aircraft image projector according to exemplary embodiments of the invention allow for efficiently projecting a light output, in particular an image, onto a target surface, which target surface may be a ground portion below the aircraft or an exterior surface portion of the aircraft or a combination of a ground portion below the aircraft and an exterior surface portion of the aircraft. An exterior aircraft image projector and a method of controlling an exterior aircraft image projector according to exemplary embodiments of the invention may in particular allow for adjusting the intensity of the light emission of the exterior aircraft image projector for efficiently generating a well recognizable image on the target surface at low energy consumption and/or with a long lifetime of the at least one light source. Making the intensity of the light output of the at least one light source dependent on the brightness level of the target surface may allow for providing a well recognizable image without using excessive amounts of energy and/or unnecessarily reducing the lifetime of the at least one light source due to excessively intense light emission.

The provision of the image via the exterior aircraft image projector, in particular when the aircraft is on the ground, may convey signalling information to the passengers and/or ground personnel and/or crew members. For example, the image may indicate the position of particular aircraft parts on the ground, such as the position of a stairway, for helping passengers to locate the same. Also, the projection of the image to a ground portion may help in recognizing the extension of the aircraft on the airfield, for example when provided on a ground portion underneath the wing/wing tip of the aircraft, thus helping drivers of ground vehicles to navigate around the aircraft. Also, the image may contain information about the particular aircraft. For example, the projection of an airline logo on a ground portion or on an exterior surface portion of the aircraft may help passengers and/or ground personnel and/or crew members in identifying the aircraft, thus helping in facilitating a smooth servicing and/or boarding and/or de-boarding of the aircraft.

In an embodiment, the exterior aircraft image projector is installed on the aircraft outer structure. This allows for an easy installation and maintenance of the exterior aircraft image projector.

In an embodiment, the exterior aircraft image projector is installed on an inside of an outer skin of the aircraft, so that the outer skin of the aircraft protects the exterior aircraft image projector from adverse ambient conditions, such as water and/or dirt and/or aerodynamic forces.

In an embodiment, the exterior aircraft image projector, when operating, projects the light beam through a lens cover, which is part of the aircraft outer structure, in particular part of the outer skin of the aircraft. Said lens cover helps to protect the exterior aircraft image projector from adverse ambient conditions, such as water and/or dirt and/or aerodynamic forces.

Projecting an image onto a target surface, which may be a ground portion below the aircraft or an exterior surface portion of the aircraft or a combination of a ground portion below the aircraft and an exterior surface portion of the aircraft, may include projecting simple geometric shapes, such as light beams having defined outer contours, onto the target surface.

The projected image may be of single color, including white color. In alternative configurations, the projected image may comprise multiple colors.

Projecting an image onto at least one of a ground portion below the aircraft and an exterior surface portion of the aircraft may further include projecting changing images, such as movies or image sequences, onto at least one of a ground portion below the aircraft and an exterior surface portion of the aircraft.

In an embodiment, the function of the brightness level is a monotonically increasing function. The function of the brightness level in particular may be an at least piecewise proportional function of the brightness level, also referred to as an at least piecewise linear function of the brightness level. Such a function provides a suitable way of adjusting the intensity of the light output to the brightness level of the target surface, while having low implementation complexity.

In an embodiment, the controller is configured for controlling the at least one light source to emit the light output with such an intensity that the target surface is illuminated with a brightness which is at least twice as high, in particular substantially twice as high, as the brightness of said target surface when the at least one light source is switched off. This results in an illumination of the target surface which is bright enough for generating an image on the target surface which has a sufficiently large contrast for being well visible by the human eye, even under changing environmental illumination conditions.

In an embodiment, the controller comprises a memory for storing a distance parameter indicating a distance between the exterior aircraft image projector and the target surface. Said distance parameter may be an input to the function determining the intensity of the light output of the at least one light source. Storing the distance parameter in a memory of the controller allows the controller to determine the necessary light output emitted by the at least one light source without detecting the distance between the exterior aircraft image projector and the target surface. Thus, in such a configuration, there is no need for providing a distance sensor for detecting the distance, and the costs for such a detector may be saved. The distance parameter may also be used for deriving the brightness level of said at least one of the ground portion below the aircraft and the exterior surface portion of the aircraft from the raw photo detector measurement.

In an embodiment, the function of the brightness level provides a constant output value if the brightness level of the target surface is below a minimum brightness threshold. The minimum brightness threshold may be between 50 lx and 200 lx, in particular at 100 lx. Such a function of the brightness level results in a sufficient light output for reliable recognition of the image, when the brightness level caused by ambient light is relatively low.

In an embodiment, the controller is configured to deactivate the at least one light source if the brightness level of the target surface is above a maximum brightness threshold. The maximum brightness threshold in particular may be between 400 lx and 1000 lx, further in particular at 500 lx. Such a configuration saves electrical energy and prolongs the lifetime of the at least one light source in situations in which the brightness level of the target surface is too high for projecting an image onto said target surface which is well recognizable to the human eye.

In an embodiment, the function of the brightness level is a linear function between the minimum brightness threshold and the maximum brightness threshold. In this way, an effective and conveniently implementable function is established for ambient brightness levels where the adjustment of the light output on the basis of the brightness level of the target surface has a large effect on the human perception.

In an embodiment, the photo detector is oriented towards the optical system and the optical system directs ambient light reflected by the target surface onto the photo detector. The photo detector may in particular be arranged adjacent to the at least one light source. Such a configuration avoids the need for providing an additional optical system for the photo detector. As a result, the costs and the dimensions of the exterior aircraft image projector may be kept low, as compared to a configuration in which an additional optical system for the photo detector is used.

In an embodiment, the controller is configured to switch off the at least one light source and to determine the brightness level of the target surface from the brightness signal provided by the photo detector while the at least one light source is switched off. This allows for determining the brightness level of the target surface without the additional light emitted by the at least one light source. As a result, the intensity of the light output of the at least one light source may be adjusted particularly well to the ambient light conditions, without being distorted by the light output of the at least one light source.

In an embodiment, the at least one light source is switched off for a short period of time, e.g. for a period of time of less than 1 s, in particular for a period of time which is shorter than $1/10$ of a second, so that the switching off is not recognized by the human eye.

In an embodiment, the at least one light source is switched off repeatedly, in particular periodically, e.g. in a range from being switched off every 10 s to being switched off every 100 s, in order to allow adjusting the intensity of the light output emitted by the at least one light source to changing ambient light conditions.

In an embodiment, the exterior aircraft image projector further comprises a shutter and/or an at least partially transparent image generating element within the optical system. The at least partially transparent image generating element in particular may be a slide. Providing a shutter and/or an at least partially transparent image generating element within the optical system allows for modifying the light beam, in particular the contours of the light beam, for projecting a desired image or light pattern onto the target surface. The term shutter may refer to a light blocking element that has a particular shape and thus allows for a particular light pattern to pass therethrough/therearound.

The shutter and/or the at least partially transparent image generating element may be changeable or replaceable in order to allow changing the projected image. The at least partially transparent image generating element may in particular be a controllable LCD panel with a plurality of controllable pixels. Such an LCD panel allows for projecting a plurality of different images or even movies/image sequences onto the target surface by controlling the LCD panel accordingly. The at least partially transparent image generating element panel may be of single color ("black-and-white") or of multiple colors, in order to allow projecting colored patterns and/or images.

In an embodiment, the at least one light source is or comprises at least one LED. LEDs provide reliable and efficient light sources, which may be provided at reasonable costs.

In an embodiment, the at least one light source is a single light source.

In an embodiment, the at least one light source comprises a plurality of light sources, e.g. a plurality of LEDs. The plurality of light sources may include light sources emitting light of different colors. An exterior aircraft image projector with a plurality of light sources emitting light of different colors may allow for projecting light patterns/images in different colors at different points in time, without using colored transparent images within the optical system. Projecting light patterns in different colors may be possible, using a simple, robust and inexpensive shutter within the optical system.

In an aircraft according to an exemplary embodiment of the invention, the at least one exterior aircraft image projector may be arranged in a door, a flap, a wing, a movable stairway or a ladder of the aircraft. The at least one exterior aircraft image projector may be configured for projecting the image onto a ground portion below the aircraft, which is visible to passengers boarding and/or exiting the aircraft.

The projected images may include aircraft identification information, such as a logo of the airline operating the aircraft, or additional information for the passengers. The projected images may for example indicate that only passengers sitting in specific rows of the aircraft cabin should use the respective door. Similarly, a red projection may indicate that passengers are not yet allowed to enter the aircraft, whereas a green projection may indicate that the aircraft is ready for boarding.

In an embodiment, the at least one exterior aircraft image projector is configured for projecting the image onto an exterior surface portion of the aircraft, in particular onto a portion of the fuselage of the aircraft. In case of an airplane comprising wings, the at least one exterior aircraft image projector may be configured for projecting the image onto a portion of one of the wings of the aircraft. The at least one exterior aircraft image projector may in particular be configured for projecting the image onto a wing tip, extending substantially vertically from an end portion of one of the wings. Images projected on wing tips are well recognizable to passengers sitting within the aircraft and looking out of a window as well as to ground personnel on the airfield/in the tower. The exterior aircraft image projector may be arranged within a wing of the aircraft.

BRIEF DESCRIPTION OF FIGURES

Further exemplary embodiments of the invention will be described with respect to the accompanying drawings, wherein.

DETAILED DESCRIPTION

Figure 1:
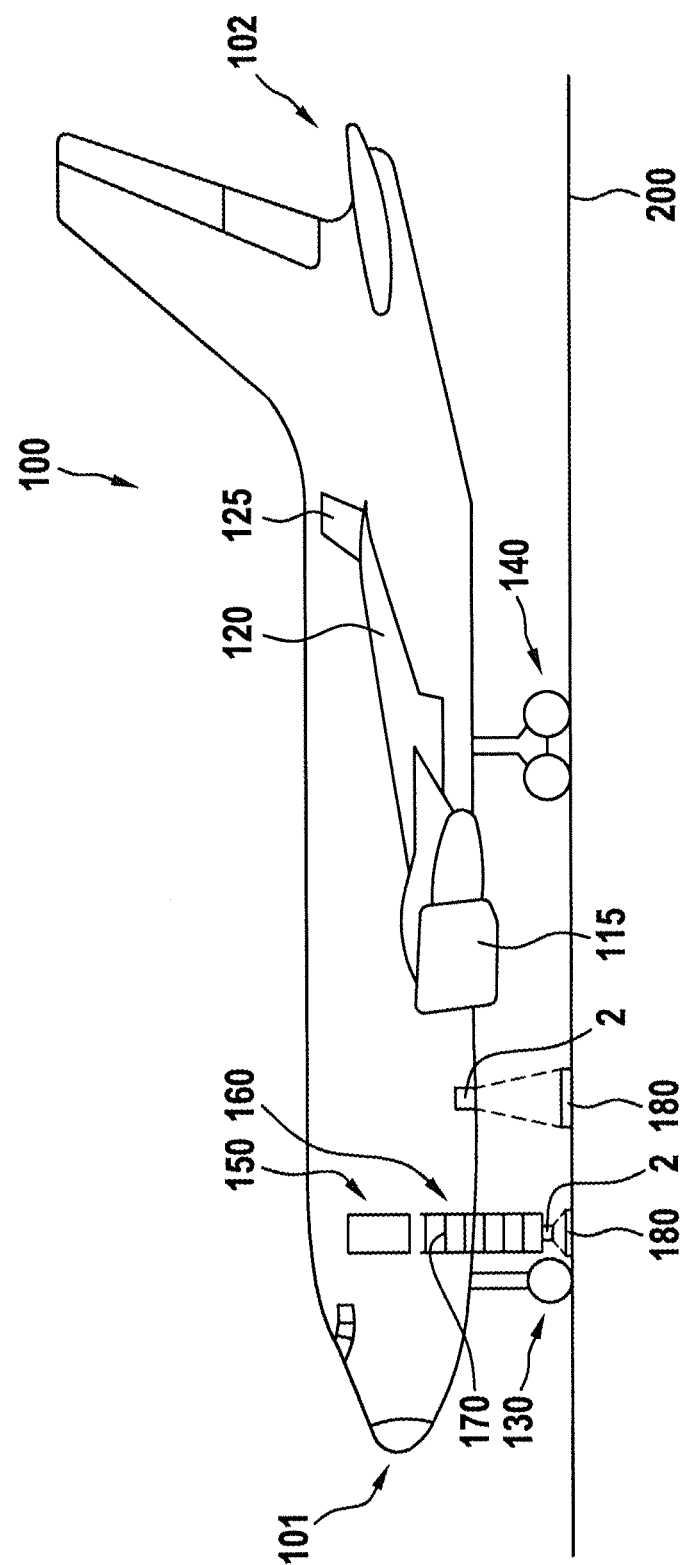
FIG. 1 shows a schematic side view of an aircraft according to an exemplary embodiment of the invention.

FIG. 1 shows a schematic side view of an aircraft 100, in particular of an airplane 100, comprising a plurality of exterior aircraft image projectors 2 according to exemplary embodiments of the invention.

Figure 2:
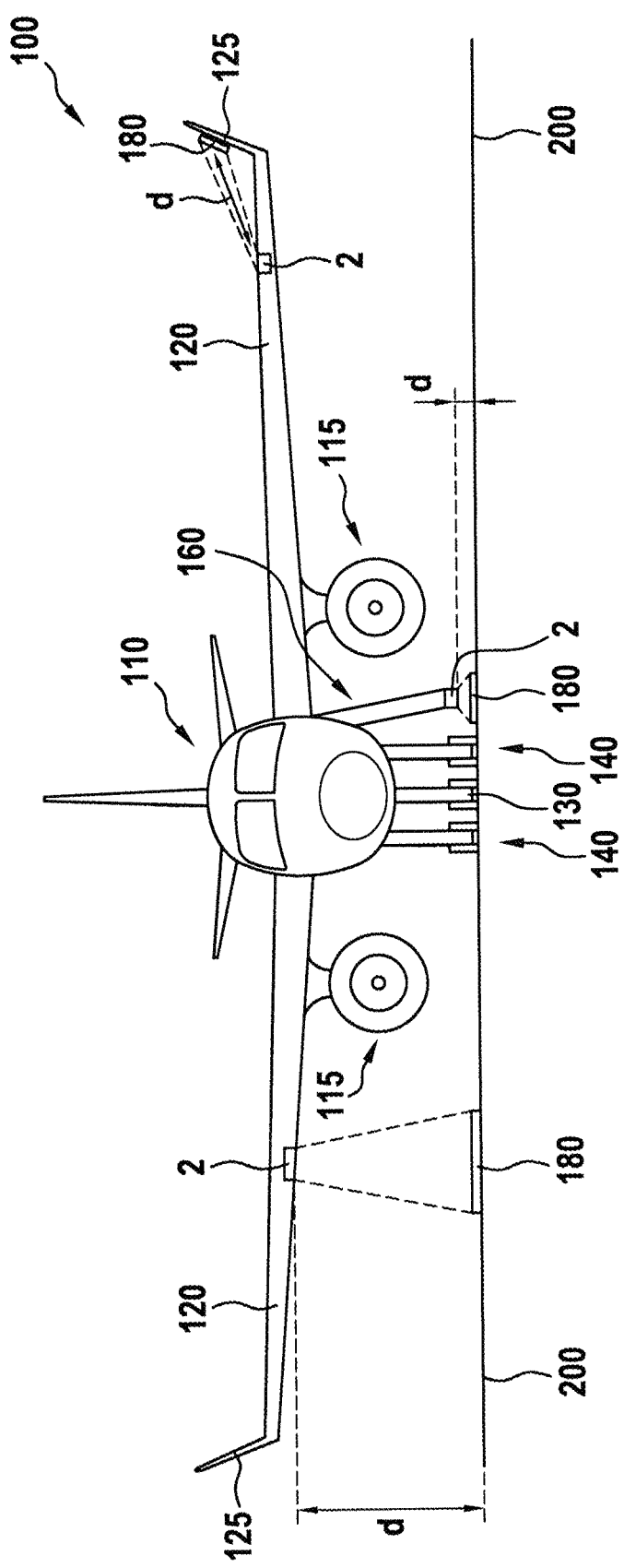
FIG. 2 shows a schematic front view of the aircraft depicted in FIG. 1.

FIG. 2 shows a schematic front view of the aircraft 100 depicted in FIG. 1.

The aircraft 100 depicted in FIGS. 1 and 2 is resting on a ground 200, such as a runway, a taxi way or an airport ramp. The aircraft 100 has a fuselage 110, two wings 120 extending laterally from the fuselage 110, a front gear 130 and two main gears 140. Each wing 120 supports an engine 115. Only one of the wings 120, the engines 115 and the main gears 140 is visible in the side view shown FIG. 1.

At least one door 150 is formed within the fuselage 110. The aircraft 100 further comprises a foldable and/or retractable stairway 160, including a plurality of steps 170, allowing passengers and crew members to transfer between the ground 200 and the at least one door 150 for boarding and/or exiting the aircraft 100. Although only one door 150 is depicted in FIG. 1, the aircraft 100 may have a plurality of doors 150, in particular one or more doors 150 on each side of the aircraft 100. A foldable and/or retractable stairway 160 may be provided at each of said doors 150.

An exterior aircraft image projector 2 according to an exemplary embodiment of the invention is mounted to the stairway 160, in particular to one of the lower steps 170 of the stairway 160.

In the embodiment shown in FIGS. 1 and 2, the exterior aircraft image projector 2 is configured and arranged for projecting a light beam, in particular a light beam forming an image 180, onto the ground 200 below the aircraft 100, in particular onto a portion of the ground 200 close to the stairway 160.

The projected image 180 does not necessarily need to be projected onto a portion of the ground 200 located exactly underneath the aircraft 100. The image 180 may be projected onto a portion of the ground 200 extending between a tip 101 and a tail 102 of the aircraft 100 in the longitudinal direction and between the outer ends of the wings 120 in the lateral direction of the aircraft 100.

Alternatively or additionally, an exterior aircraft image projector 2 according to an exemplary embodiment of the invention may be mounted to the fuselage 110 and/or to one of the wings 120 of the aircraft 100. An exterior aircraft image projector 2, mounted to the fuselage 110 of the aircraft 100 in a region between the door 150 and the wing 120, is depicted in FIG. 1. Two exterior aircraft image projectors 2, mounted to the wings 120 of the aircraft 100, are depicted in FIG. 2. The positions of the exterior aircraft image projectors 2 depicted in FIG. 2, however, are only exemplary, i.e. exterior aircraft image projectors 2 may be located in other areas of the fuselage 110 and the wings 120 of the aircraft as well.

Each of the exterior aircraft image projectors 2 may be configured for projecting an image 180 onto the ground 200, onto the outer skin of the fuselage 110 of the aircraft 100 and/or onto a wing tip 125 extending in a substantially vertical direction from an end of a wing 120.

Figure 3:
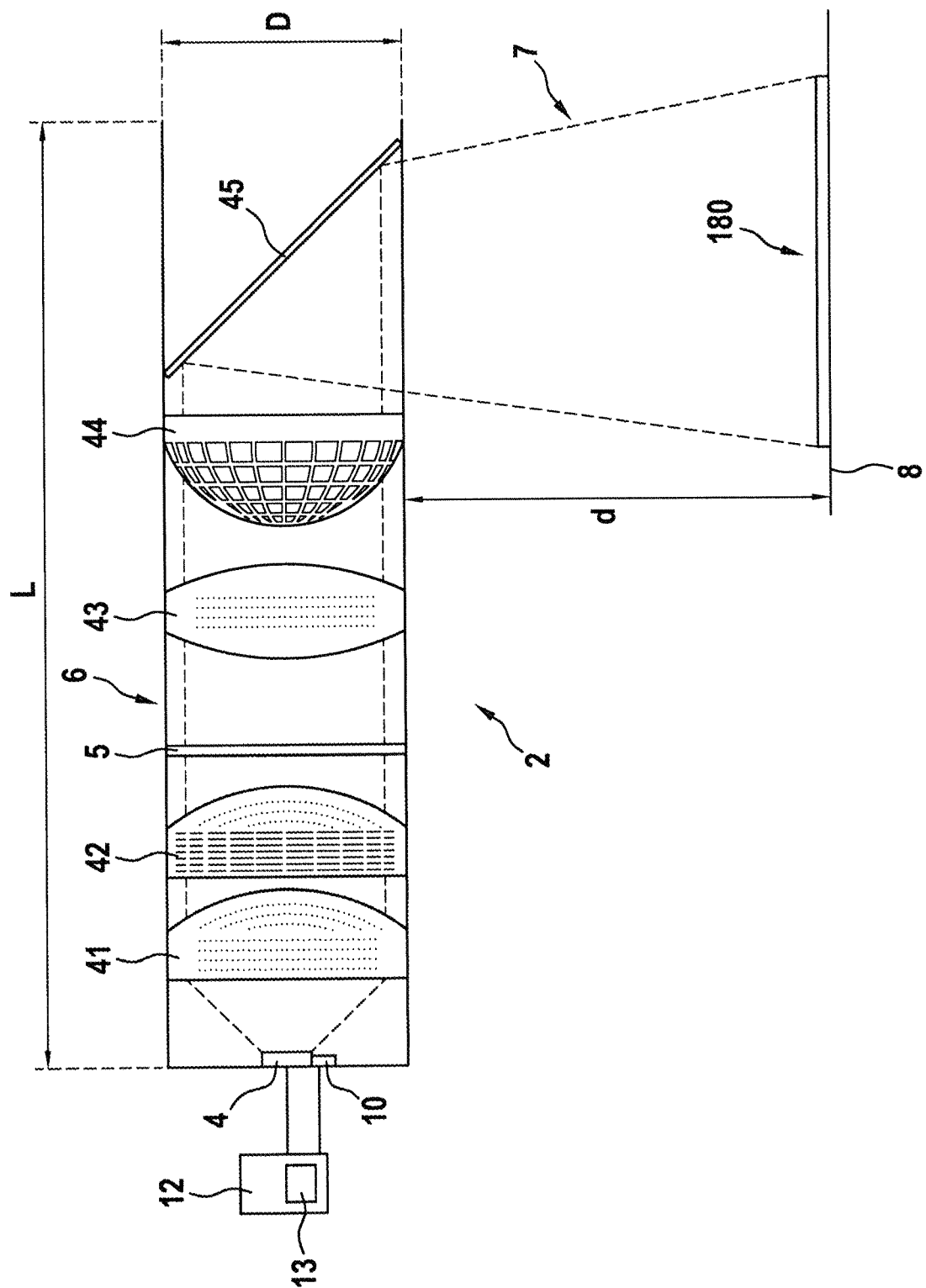
FIG. 3 depicts a schematic cross-sectional view of an exterior aircraft image projector according to an exemplary embodiment of the invention.

FIG. 3 depicts a schematic cross-sectional view of an exterior aircraft image projector 2 according to an exemplary embodiment of the invention.

The exterior aircraft image projector 2 comprises at least one light source 4, generating a light output when operated. The at least one light source 4 may be or include at least one LED. The exterior aircraft image projector 2 may comprise only one light source 4 or a plurality of light sources 4. If the exterior aircraft image projector 2 comprises a plurality of light sources 4, these light sources 4 may emit light having different wavelengths/colors, in order to allow the exterior aircraft image projector 2 to selectively project images 180 having different colors by selectively activating one or more of the light sources 4.

The exterior aircraft image projector 2 further comprises an optical system 6, which is configured for transforming the light output emitted by at least one light source 4 into a light beam 7 and projecting said light beam 7 onto a target surface 8. As explained with respect to FIGS. 1 and 2, said target surface 8 may be a portion of the ground 200 ("ground portion") below or in the vicinity of the aircraft 100. Said target surface 8 also may be an exterior surface portion of the aircraft 100 itself, in particular an exterior surface portion of the fuselage 100 or one of the wings 120 of the aircraft 100.

The optical system 6 may comprise one or more optical elements. In the exemplary embodiment of FIG. 3, the optical system 6 comprises five optical elements 41, 42, 43, 44, 45, namely lenses 41, 43, a reflector 45, optical diffusers 42, 44, etc.

In an exemplary embodiment, the exterior aircraft image projector 2 may have a length L of 50 mm to 100 mm, in particular a length of 70 mm to 75 mm, and a diameter D of 20 mm to 25 mm.

The optical system 6 may further comprise an image generating element 5, which is configured for modifying the light beam 7, in order to project not only a general illumination light beam 7, but an image 180 onto the target surface 8.

In an exemplary embodiment, the image generating element 5 is a shutter 5, i.e. a piece of light blocking material in which at least one opening is formed for allowing light to pass through. In such a configuration, the image 180 projected onto the target surface 8 by the exterior aircraft image projector 2 is defined by the contour(s) of the at least one opening formed within the shutter 5.

The image generating element 5 may also include a transparent material, such as a slide or film made of glass or transparent plastic. Selected portions of the said transparent material may be made non-transparent or semi-transparent by coloring and/or coating said selected portions with a non-transparent or semi-transparent material. Coloring/coating different portion of the image generating element 5 with different colors allows projecting colored images 180 onto the target surface 8.

The image generating element 5 in particular may be a dynamic image generating element 5, such as a semi-transparent LCD-element comprising a plurality of individually controllable pixels. An exterior aircraft image projector 2 comprising a dynamic image generating element 5 allows for projecting different images or even movies onto the target surface 8 by appropriately controlling the dynamic image generating element 5, e.g. by individually switching the pixels of a semi-transparent LCD-element on and off.

The image generating element 5 may have a size of 50 mm2 to 150 mm2, in particular a size of 100 mm2. The image generating element 5 may have a rectangular shape with a side length of 5 mm to 15 mm, in particular a quadratic shape with a side length of 10 mm.

It is pointed out that exemplary embodiments of the invention also include an exterior aircraft image projector 2 without an image generating element 5. In particular, the exterior aircraft image projector 2 according to an exemplary embodiment of the invention may have a holding fixture for holding an image generating element 5, with the actual image generating element 5 being inserted at the time of assembly into the aircraft. For example, a particular image generating element 5 may be installed at the time of assembly, depending on the intended specific use of the exterior aircraft image projector 2 in operation. Simply by having holding means for a shutter, a slide, or any other suitable image generating element, the exterior aircraft image projector 2 is considered suitable for projecting an image onto a target surface.

The exterior aircraft image projector 2 further comprises a photo detector 10 for detecting a brightness level of the target surface 8.

The photo detector 10 may in particular be arranged next to the at least one light source 4. When the photo detector 10 is arranged in the vicinity of the at least one light source 4, e.g. in a distance of less than 10 mm, in particular in a distance of less than 5 mm, from the at least one light source 4, ambient light reflected by the target surface 8 is directed and/or focused by the optical system 6 onto the at least one photo detector 10. In consequence, no additional (second) optical system 6 is necessary for directing ambient light from the target surface 8 onto the photo detector 10.

The photo detector 10 and the at least one light source 4 are coupled, i.e. electrically connected, to a controller 12. The controller 12 is configured for evaluating a brightness signal, provided by the photo detector 10, and driving the at least one light source 4, in order to provide the image with sufficient brightness on the target surface 8.

In operation, the controller 12 adjusts the intensity of the light output, emitted by the at least one light source 4, as a function of the brightness level of the target surface 8, as it is detected by the photo detector 10. The controller 12 in particular adjusts the intensity of the light output, emitted by the at least one light source 4, for ensuring a sufficiently large contrast between the portions of the target surface 8 illuminated by the light beam 7 and adjacent portions, which are not illuminated by the light beam 7 but only by ambient light. This results in a good visibility of the image, projected by the exterior aircraft image projector 2.

For appropriately adjusting the intensity of the light output, emitted by the at least one light source 4, the controller 12 takes into account information about the distance d between the exterior aircraft image projector 2 and the target surface 8. As is apparent from FIGS. 1 and 2, said distance d depends on the location and orientation of the exterior aircraft image projector 2 at the aircraft 100. A distance parameter, indicating the distance d between the exterior aircraft image projector 2 and the target surface 8, is set within the controller 12, when the exterior aircraft image projector 2 is produced or when it is installed in the aircraft 100.

Since the distance d between the exterior aircraft image projector 2 and the target surface 8 remains constant after the exterior aircraft image projector 2 has been installed in the aircraft 100, no distance sensor is needed for determining said distance d. In consequence, the extra costs and complexity for providing a distance sensor may be saved.

In order to allow for determining the brightness level of the target surface 8 caused by ambient light only, i.e. without the additional illumination provided by the exterior aircraft image projector 2, the at least one light source 4 may be switched off by the controller 12 and the brightness level of the target surface 8 may be detected while the at least one light source 4 is switched off. The at least one light source 4 may be switched off for a short period of time, e.g. for a period of time of less than 1 s, in particular for a period of time which is shorter than $1/10$ of a second, so that the human eye does not recognize that the at least one light source 4 has been switched off.

The at least one light source 4 may be switched off repeatedly, in particular periodically, for example in a range from every 10 s to every 100 s, in order to allow for adjusting the intensity of the light output, emitted by the at least one light source 4, to changing ambient light conditions.

Figure 4:
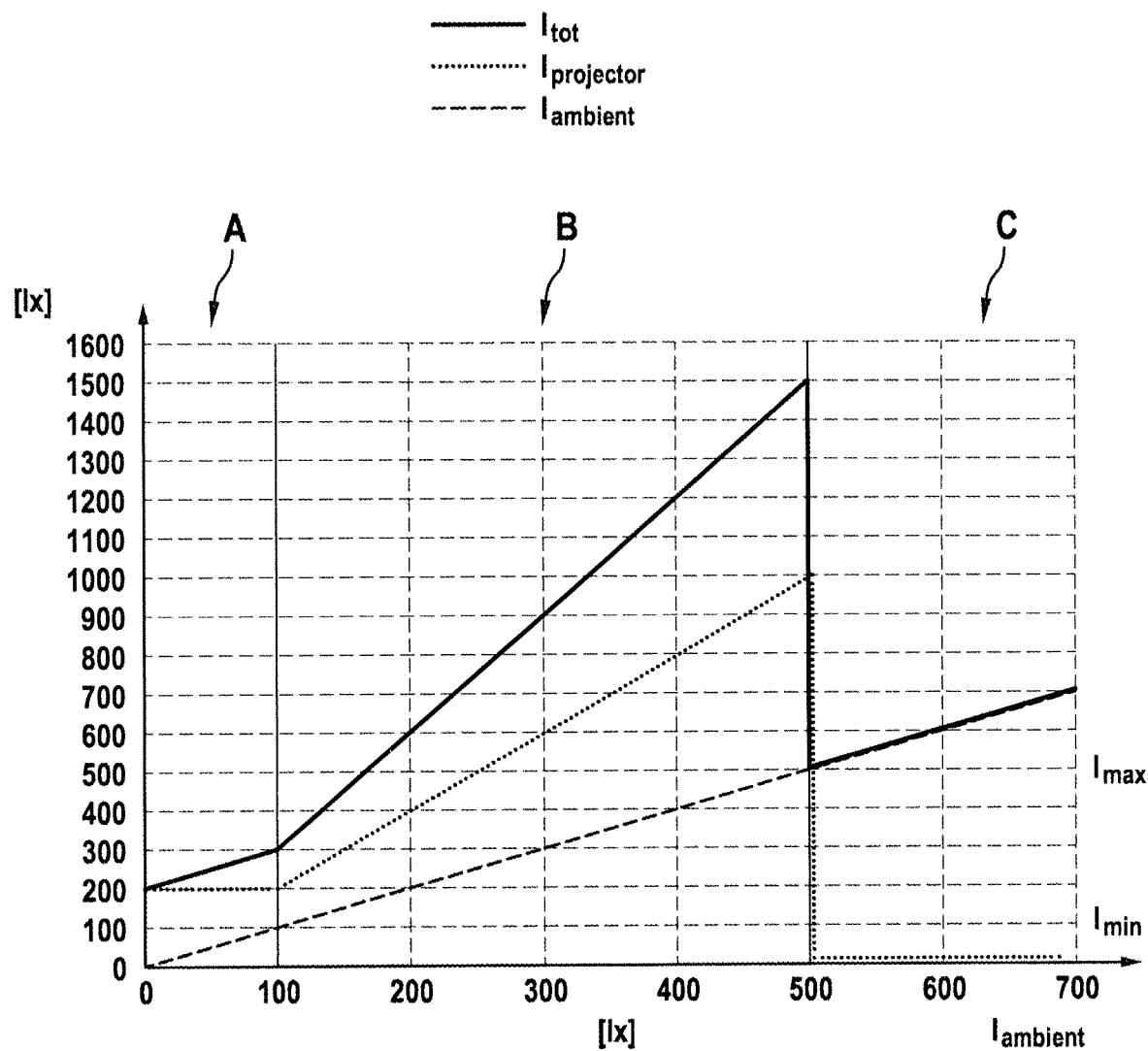
FIG. 4 shows a graph illustrating an example of the relationship between the brightness level of the target surface, illuminated by ambient light only, the brightness of the additional illumination of the target surface, provided by an exterior aircraft image projector according to an exemplary embodiment of the invention, and the resulting brightness level of the target surface.

FIG. 4 shows a diagram illustrating an exemplary relationship between the brightness level of the target surface 8, illuminated by ambient light only (dashed line), the brightness of the additional illumination of the target surface 8, provided by the light beam 7 of the exterior aircraft image projector 2 (dotted line), and the resulting brightness level of the target surface 8 (solid line). In the diagram shown in FIG. 4, the brightness level Iambient of the target surface 8, illuminated by ambient light only, is plotted on the horizontal axis.

The resulting brightness level Itot of the target surface 8 is the sum of the brightness level Iambient of the target surface 8, stemming from ambient light only, and the additional brightness Iprojector, added by the light beam 7 emitted by the exterior aircraft image projector 2, i.e. Itot=Iambient+Iprojector. In FIG. 4, the brightness levels are indicated as illuminance values, with the SI unit being lux/lx.

In a first operational range A, in which the brightness level Iambient of the target surface 8, as illuminated by ambient light, is below a minimum brightness threshold Imin of 100 lx, the additional illumination of the target surface 8, as provided by the light beam 7 of the exterior aircraft image projector 2, is constant, with the light beam 7 creating an additional illuminance of 200 lx at the target surface. In consequence, the brightness Itot of the portions of the target surface 8 illuminated by the exterior aircraft image projector 2 starts at 200 lx if there is no ambient light (Iambient=0), and increases linearly with an increasing brightness level Iambient due to ambient light (Itot=Iambient+200 lx).

In a second operational range B, in which the brightness level Iambient of the target surface 8, as illuminated by ambient light, is in the range between a minimum brightness threshold Imin of 100 lx and a maximum brightness threshold Imax of 500 lx, the additional brightness Iprojector of the target surface 8, provided by the light beam 7 of the exterior aircraft image projector 2, increases with the increasing brightness level Iambient of the target surface 8, as illuminated by ambient light.

For example, while the added brightness Iprojector on the target surface 8, provided by the light beam 7 of the exterior aircraft image projector 2, is 200 lx, when the brightness level Iambient of the target surface 8 due to ambient light is 100 lx, the added brightness Iprojector on the target surface 8, provided by the light beam 7 of the exterior aircraft image projector 2, is increased to 1000 lx, when the brightness level Iambient of the ambient light increases to Imax=500 lx. As a result, the ratio between the total brightness Itot, i.e. the sum of the brightness Iambient, provided by ambient light, and the additional brightness Iprojector, provided by the exterior aircraft image projector 2 (Itot=Iambient+Iprojector) and the brightness Iambient, provided by ambient light alone, remains constant at Itot:Iambient=3:1, when the brightness Iambient provided by ambient light increases. This ratio results in a good visibility of the image 180, projected by the exterior aircraft image projector 2, over a wide range of ambient light conditions.

When the brightness Iambient of the target surface 8 due to ambient light exceeds the maximum brightness threshold Imax of 500 lx, as in the third operational range C shown in FIG. 4, the at least one light source 4 is not strong enough for generating sufficient contrast between the portions illuminated by the light beam 7 and surrounding portions, which are illuminated by ambient light only. Thus, for increasing the lifetime of the at least one light source 4 and in order to avoid wasting electrical energy for projecting an image which is barely visible or not visible at all to the human eye, the exterior aircraft image projector 2 is switched off.

The specific values for the brightness levels Iambient of the target surface 8 due to ambient light and the brightness levels Iprojector on the target surface 8 due to additional illumination, provided by the exterior aircraft image projector 2, as shown in FIG. 4, are only exemplary and may be adjusted according to the specific circumstances of the desired illumination. These circumstances include, but are not limited to the maximum light intensity the at least one light source 4 is capable to provide, the distance d between the exterior aircraft image projector 2 and the target surface 8, and the purpose of the projected light pattern.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:

1. An exterior aircraft image projector, configured to be installed on an aircraft for projecting an image or light pattern onto a ground portion below the aircraft, the exterior aircraft image projector comprising:
   at least one light source, providing a light output in operation;
   an optical system configured for transforming the light output of the at least one light source into a light beam and projecting said light beam onto said ground portion below the aircraft;
   a photo detector arranged to detect a brightness level (Iambient) of said ground portion below the aircraft and configured to provide a corresponding brightness signal; and
   a controller, coupled to the photo detector and the at least one light source, the controller being configured to control an intensity of the light output of the at least one light source as a function of the brightness level (Iambient), as provided by the photo detector via the brightness signal;
   wherein the optical system comprises an exchangeable shutter, an exchangeable at least partially transparent image generating element, or a controllable LCD panel.

2. The exterior aircraft image projector according to claim 1, wherein the function of the brightness level (Iambient) is a monotonically increasing function, in particular an at least piecewise proportional function of the brightness level (Iambient).

3. The exterior aircraft image projector according to claim 1, wherein the controller is configured to control the at least one light source to emit the light output with such an intensity that said ground portion below the aircraft is illuminated with a brightness which is at least twice as high as the brightness (Iambient) of said ground portion below the aircraft when the at least one light source is switched off.

4. The exterior aircraft image projector according to claim 1, wherein the controller comprises a memory for storing a distance parameter indicating the distance (d) between the exterior aircraft image projector and said ground portion below the aircraft, and wherein said distance is an input to said function of the brightness level (Iambient).

5. The exterior aircraft image projector according to claim 1, wherein the function of the brightness level (Iambient) has a constant output value for the brightness level (Iambient) of said ground portion below the aircraft being below a minimum brightness threshold (Imin).

6. The exterior aircraft image projector according to claim 5, wherein the minimum brightness threshold (Imin) is between 50 lx and 200 lx.

7. The exterior aircraft image projector according to claim 1, wherein the controller is configured to deactivate the at least one light source if the brightness level of said ground portion below the aircraft is above a maximum brightness threshold (Imax).

8. The exterior aircraft image projector according to claim 7, wherein the maximum brightness threshold (Imax) is between 400 lx and 1000 lx.

9. The exterior aircraft image projector according to claim 1, wherein the photo detector is oriented towards the optical system, with the optical system directing ambient light reflected by said ground portion below the aircraft onto the photo detector, wherein the photo detector in particular is arranged adjacent to the at least one light source.

10. The exterior aircraft image projector according to claim 1, wherein the controller is configured to repeatedly switch off the at least one light source and to determine the brightness level of said ground portion below the aircraft from the brightness signal provided by the photo detector while the at least one light source is switched off.

11. The exterior aircraft image projector according to claim 1, wherein the at least one light source is a single light source.

12. The exterior aircraft image projector according to claim 1, wherein the at least one light source comprises a plurality of light sources of different colors.

13. An Aircraft comprising at least one exterior aircraft image projector according to claim 1.

14. The aircraft according to claim 13, wherein the at least one exterior aircraft image projector is arranged in a door, in a flap, at a movable stairway or at a ladder of the aircraft.

15. The aircraft according to claim 13, wherein the aircraft comprises at least one wing and the at least one exterior aircraft image projector is arranged within said at least one wing.

16. A method of controlling an exterior aircraft image projector, which is configured to be installed on an aircraft for projecting an image or light pattern onto a ground portion below the aircraft and which comprises at least one light source, providing a light output in operation and an optical system configured for transforming the light output of the at least one light source into a light beam and projecting said light beam onto said ground portion below the aircraft, wherein the optical system comprises an exchangeable shutter, an exchangeable at least partially transparent image generating element, or a controllable LCD panel;

the method comprising:
detecting a brightness level (Iambient) of said ground portion below the aircraft with a photo detector of the exterior aircraft image projector; and
controlling an intensity of the light output of the at least one light source as a function of said brightness level (Iambient).

* * * * *